US012464301B2

(12) United States Patent
Roug et al.

(10) Patent No.: US 12,464,301 B2
(45) **Date of Patent: *Nov. 4, 2025**

(54) SPEAKER ASSEMBLY FOR HEARING AID

(71) Applicant: Oticon A/S, Smørum (DK)

(72) Inventors: Jacob Anders Roug, Smørum (DK); Peter Sommer, Smørum (DK); Martin Larsen, Smørum (DK); Anders Højsgaard Thomsen, Smørum (DK); Peter H. Weis, Smørum (DK); Bjarke Mejnertsen, Smørum (DK)

(73) Assignee: Oticon A/S, Smørum (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/678,790

(22) Filed: May 30, 2024

(65) Prior Publication Data

US 2024/0314506 A1 Sep. 19, 2024

Related U.S. Application Data

(60) Continuation of application No. 18/348,633, filed on Jul. 7, 2023, now Pat. No. 12,028,688, which is a (Continued)

(30) Foreign Application Priority Data

Dec. 4, 2018 (EP) .................................... 18210152

(51) Int. Cl.
*H04R 25/00* (2006.01)

(52) U.S. Cl.
CPC ......... *H04R 25/604* (2013.01); *H04R 25/554* (2013.01); *H04R 25/602* (2013.01);
(Continued)

(58) Field of Classification Search
CPC ...... H04R 2225/021; H04R 2225/0216; H04R 2225/025; H04R 2225/51; H04R 2225/57;
(Continued)

(56) References Cited

U.S. PATENT DOCUMENTS 4,937,876 A 6/1990 Biërmans
6,445,799 B1 9/2002 Taenzer et al.
(Continued)

FOREIGN PATENT DOCUMENTS

EP 2 238 773 A2 10/2010
EP 2 424 275 A1 2/2012
(Continued)

*Primary Examiner* — Phylesha Dabney
(74) *Attorney, Agent, or Firm* — Birch, Stewart, Kolasch & Birch, LLP

(57) ABSTRACT

There is provided a hearing aid with a Receiver In The Ear speaker assembly comprising a connecting member with electric conductors connecting a connector at one end, and a receiver housing with a receiver at the opposite end. A microphone housing with a microphone is attached to the connecting member. The microphone housing with the microphone is separated by a distance from the receiver in the receiver housing, thus reducing acoustic or mechanical feedback problems. Especially, the microphone and connector may share one common housing.

12 Claims, 3 Drawing Sheets

Related U.S. Application Data continuation of application No. 17/692,947, filed on Mar. 11, 2022, now Pat. No. 11,736,875, which is a division of application No. 16/701,386, filed on Dec. 3, 2019, now Pat. No. 11,323,828.

(52) U.S. Cl.
CPC ..... *H04R 25/609* (2019.05); *H04R 2225/021* (2013.01); *H04R 2225/025* (2013.01); *H04R 2225/51* (2013.01)

(58) Field of Classification Search
CPC ......................... H04R 2225/61; H04R 25/456; H04R 25/554; H04R 25/556; H04R 25/602; H04R 25/604; H04R 25/609
USPC .......................................................... 381/315
See application file for complete search history.

(56) References Cited

U.S. PATENT DOCUMENTS

| | | | | |
|---|---|---|---|---|
| 7,715,581 | B2 | 5/2010 | Schanz | |
| 7,946,890 | B1 | 5/2011 | Bondo et al. | |
| 8,295,523 | B2 * | 10/2012 | Fay | H04R 25/604 381/328 |
| 10,034,103 | B2 | 7/2018 | Puria | |
| 10,887,706 | B2 | 1/2021 | Feeley et al. | |
| 11,323,828 | B2 | 5/2022 | Roug et al. | |
| 11,736,875 | B2 | 8/2023 | Roug et al. | |
| 2008/0285782 | A1 | 11/2008 | Gommel et al. | |
| 2009/0092271 | A1 | 4/2009 | Fay et al. | |
| 2009/0123010 | A1 | 5/2009 | Cano et al. | |
| 2015/0078602 | A1 | 3/2015 | Sohn et al. | |
| 2016/0381472 | A1 * | 12/2016 | Feeley | H04R 25/607 381/322 |
| 2020/0178010 | A1 * | 6/2020 | Roug | H04R 25/609 |

FOREIGN PATENT DOCUMENTS

| | | | | |
|---|---|---|---|---|
| EP | 3 343 952 | A1 | 7/2018 | |
| WO | WO 00/76271 | A1 | 12/2000 | |
| WO | WO 03/015463 | A2 | 2/2003 | |
| WO | WO 03/015463 | A3 | 2/2003 | |
| WO | WO 2009/083007 | A1 | 7/2009 | |
| WO | WO-2009123561 | A1 * | 10/2009 | H04R 25/402 |

* cited by examiner

SPEAKER ASSEMBLY FOR HEARING AID

This application is a Continuation Application of copending application Ser. No. 18/348,633, filed Jul. 7, 2023, which is a Continuation Application of application Ser. No. 17/692,947, filed Mar. 11, 2022 (now U.S. Pat. No. 11,736,875, issued Aug. 22, 2023), which is a Divisional of application Ser. No. 16/701,386, filed on Dec. 3, 2019 (now U.S. Pat. No. 11,323,828, issued May 3, 2022), which claims priority under 35 U.S.C. § 119 (a) to application Ser. No. 18/210,152.7, filed in Europe on Dec. 4, 2018, all of which are hereby expressly incorporated by reference into the present application.

FIELD

The present disclosure relates to hearing aids. More specifically, the disclosure relates to a speaker assembly for a hearing aid, in particular a Receiver In The Ear (RITE) hearing aid.

BACKGROUND

Hearing aids of the Receiver-In-The-Ear type (RITE) type hearing aid are known to have problems with acoustic and/or vibration feedback, if the microphone shares housing with the receiver. Thus, only a limited amplification can be provided by RITE type hearing aids. Further, when a user of a hearing aid also wears glasses, additional problems with noise due to connect between the hearing aid housing and glasses may occur. This may introduce clicking sounds into the microphone signal, both when putting the glasses on, but also while wearing the glasses and especially while moving around including chewing etc.

SUMMARY

According to the above, it may be seen as an object of the present disclosure to provide a solution to the problem with the limited possible amplification in RITE type hearing aids.

For a hearing aid, a speaker assembly may comprise three parts. a first part being a connector part for connecting to a hearing aid housing, which may be adapted to be positioned behind or at the pinna, a second part configured to be positioned in or at the ear canal, and a third part mechanically interconnecting the first and the second part.

In a first aspect, the disclosure provides a speaker assembly for a hearing aid, the speaker assembly may comprise a receiver, i.e. an output transducer, for generating an audible acoustic output, which is intended to be input into a user's ear canal in response to an electric signal, wherein the receiver is arranged in a first housing which is configured to be positioned in the user's ear canal during normal use of the speaker assembly. The speaker assembly may further comprise a microphone for capturing sound and generating an electric output accordingly, wherein the microphone may be arranged in a second housing which is separate from the first housing. The microphone may be configured as an omnidirectional microphone, or may be configured as a directional microphone, e.g. by comprising several sub-microphones, e.g. two microphone elements, combining their output into a directional signal, or a mechanical feature configured so that ambient sound is received by the microphone predominantly from a given direction. Further, a combination of multiple microphones and a mechanical/physical adaptation of an inlet may be established. The speaker assembly may further comprise a connector configured to establish electrical connection between the receiver and the hearing aid. This could be a pin-type connection or a flexible tab connection or other type of connection. The speaker assembly may further comprise an assembly with a plurality of separate electrical conductors for electrical connection to the connector at one end and for electrical connection to the receiver at the opposite end, this could be a part of a connecting member connecting the in-the-ear part with the behind-the-ear part. The speaker assembly may further comprise that the second housing is attached to the speaker assembly between the first housing and the connector.

In the present context, the term microphone in the general sense taken to mean the input transducer, which may be composed of a plurality of sub-components or microphone units together forming a microphone. As such, a microphone may mean a device composed by two, three, four or even more, individual microphones in an assembly.

The third part, with a plurality of separate electrical conductors, should be flexible so as to allow the user to arrange the ear canal part while allowing a behind-the-ear housing to be positioned at the intended position behind the ear/pinna, as the user often do not position the receiver in the exact same place in the ear canal every time, there is a need for some flexibility, also in order to allow the housing behind the ear to be placed comfortably for the user.

Such a speaker assembly is advantageous, since it allows the microphone to be placed at a distance away from the receiver, which makes the hearing aid more immune to acoustic or vibration feedback. This means that such hearing aid will allow higher amplification compared to RITE hearing aids with the microphone placed in the receiver housing.

This speaker assembly design allows selection of different trade-offs between the most natural sound, which is obtained with the microphone close to the eardrum, especially closer to the ear drum compared to the configuration where the microphone/input transducer is located in a housing to be positioned behind the pinna, and highest possible amplification, which is more likely when the microphone is further away from the speaker. e.g. positioned in the connector housing. Thus, with the possibility to have speaker assemblies each with the microphone at a different position along the speaker assembly wire, i.e. the connecting part, various sound quality versus amplification trade-offs may be obtained by such a set, or plurality, of different speaker assemblies. Thus, with a variety of speaker assemblies with different positions of the microphone, a user, or health care professional, may adapt the properties of the hearing aid, e.g. to one with a higher amplification margin, by simply changing to another speaker assembly. Further, the speaker assembly provides the possibility to have a microphone in addition to any microphones arranged in the housing to be arranged behind the ear of the user. Still further, as the size of the ear varies from person to person, selecting between speaker assemblies with the microphone placed at various places allow the hearing healthcare professional to select a speaker assembly where the microphone is around a specific place at the ear of the user, e.g. allowing for optimized directionality of the entire microphone system of the hearing aid.

The connector serves as the mechanical interface to connect the speaker assembly to e.g. a Behind The Ear (BTE) type housing, where, for instance, electric energy source, processor and amplifier of the hearing aid may be placed. As mentioned above, the speaker assembly allows the hearing aid to be flexible, since the major part of the hearing aid can be maintained, and still new, or different, acoustic properties can be provided according to the user's needs or preferences.

In such a speaker assembly, a microphone, or input transducer, may be formed using a number of smaller microphones arranged in e.g. an array or pattern. A microphone may be provided as a microphone assembly with two, three, four or more, microphones. A microphone assembly comprising four microphones may be formed so that four microphones are arranged at corners of a square, or in-line so that a line may be drawn through each of the centers of four microphones. Other geometries are also envisioned. Further, as the microphone assembly is to be arranged on/at a curved surface, the microphones of the microphone assembly may be positioned out-of-plane so that e.g. two microphones are arranged in-line in pairs and such two pairs are then arranged so that a normal vector from one of the microphones are not parallel with a normal vector from one of the other microphones. In the case where all microphones are arranged in-line, a vector perpendicular to the surface of each of the individual microphones are substantially parallel, such as within a few degrees.

Further, positioning an input transducer at the connecting member allow a further freedom of placement which is contemplated to give an opportunity to improve directionality, e.g. by obtaining a microphone angle more optimal for speech intelligibility, this could be at least partially caused by positioning a front microphone further ahead.

Even further, positioning a microphone, or input transducer, at the connecting member, a better own voice beamforming may be obtained. This could be achieved by the axis, or line, to the mouth may be greatly improved by adding e.g. a 3. microphone or input transducer on the connecting member, i.e. a microphone or input transducer positioned on or in the connecting member may be used in connection with one or more microphones or input transducers in a behind-the-ear housing.

A microphone or input transducer in the connecting member may be used in combination with a rear microphone in a behind-the-ear housing so as to form a direct axis to the mouth of the wearer.

It may be possible, by adding more microphones, to generate directionality patterns in 3D that are more advanced, or well-defined, in shape than the with two microphones. By positioning microphone, or input transducer, in the connecting member, a higher degree of design freedom for receiver-in-the ear hearing aids are achieved, which includes the option to place the input transducers more cosmetically attractive places, i.e. less visible.

In the present disclosure, various features will be described. The features may be combined in a variety of ways which will be apparent to the skilled reader.

The second housing may be attached to the connecting member at a distance from the first housing being at least 1% of a length of the connecting member between the first housing and the connector. Especially, the second housing may be attached to the connecting member at a distance from the first housing being 1% to 99% of a length of the connecting member between the first housing and the connector, such as 10% to 90% of a length of the connecting member between the first housing and the connector, or such as 30% to 70% of a length of the connecting member between the first housing and the connector.

The connector may form part of the second housing, thus the microphone and connector may share the same housing. Thereby, a high degree of separation between the receiver and the microphone is provided, thus allowing a high amplification possible with such speaker assembly.

The input transducer may be arranged in a housing embedded into or attached to the connecting member, where such an input transducer housing may include one or more inlet openings. E.g. two inlet openings may be defined in an input transducer housing, which two openings may lead sound into one single microphone or two separate microphones individually or even to two separate microphones simultaneously. An input transducer housing as described herein may exhibit similar features as described in general in relation to the input transducer, namely, the input transducer housing may be positioned at or in the connecting member separate from the connector and/or the speaker housing, i.e. separate from the connector connecting to the behind-the-ear housing of the hearing aid and/or separate from the in-the-ear part.

A length of the wire in the connecting member between the first housing and the connector may be at least 2 cm, such as at least 3 cm, or even longer than 3 cm, if preferred.

The connector may be configured to allow an external electric identification of which type of a plurality of different types the speaker assembly belongs to, wherein the type is related to a distance between the first housing and the second housing. Hereby, a set of speaker assemblies may be designed with different positions of the microphone relative to the receiver, and via the connector, the signal processing part of the hearing aid may be configured to select one or more properties according to the identified type of speaker assembly. Especially, e.g. a maximum amplification can be set according to the identified type of speaker assembly, so as to match the amplification according to the distance between the microphone and receiver. Especially, the connector may comprise one or more extra electrical connectors dedicated to allow the external electric identification, e.g. to allow external electric identification of an electric component, e.g. a resistor, connected to allow identification of the type by means of probing electric resistance value between two electrical connecting points of the connector. Alternatively, the identification can be provided by means of the electric connecting points of the connector serving to provide electric connection to the microphone and the receiver of the speaker assembly. Further, the speaker assembly may comprise a memory device storing identification information, e.g. in the form of an EEPROM or other type of memory unit. Even still further, the speaker assembly may comprise additional elements, such as one or more sensors for registering one or more physical properties. Such property could be acceleration, temperature, pressure, EEG signals, EOG signals or other types of signals originating from the human body. Multiple sensors may be included in the speaker assembly, such sensors may e.g. be positioned in or at the first housing.

The speaker assembly may comprise at least part of an antenna E.g. the antenna may be in the form of an electric conductor arranged along at least a part of the connecting member, either a dedicated electric conductor, or one or more of the plurality of electric conductors of the connecting member serving to connect the receiver or microphone with the connector. Hereby, the physical extension of the speaker assembly can be utilized to provide improved electromagnetic Radio Frequency performance of a hearing aid. The antenna may be configured to radiate and/or receive electromagnetic energy in the frequency range of 50 MHz. to 50 GHz. Preferably, the antenna is configured for connection, via the connector, to a transmission and/or reception circuit configured for transmission and/or reception of the electromagnetic energy at a frequency of within 2.4-6 GHz, however, other frequencies may be used, further, multiple carrier frequencies may be used, e.g. by using an antenna trap or the like. The transmission and/or reception circuit preferably comprises a radio frequency carrier generation circuit. The antenna and the connected transmission and/or reception circuit may be configured for: 1) transmission only, 2) reception only, or 3) both of transmission and reception. The transmission and/or reception circuit may be implemented by a number of methods including, but not limited to, Bluetooth and/or radio frequency (RF) transmission. Data transmitted and/or received via the antenna may be formatted to a proprietary protocol and/or a standardized protocol.

The hearing aid may include a near-field magnetic induction (NFMI) system, e.g. for communicating with a similar hearing aid positioned at the opposite ear of the user. This has the advantage of low loss when communication is performed through the head of the user, compared to transmitting high frequency signals across the head. Such a NFMI system may be included in the behind-the-ear housing or in the speaker assembly.

When an antenna is comprised in the speaker assembly, the hearing aid may be configured for transmitting and/or receiving wireless audio signal via the antenna. This could e.g. be used for transmitting the user's voice to a mobile phone during a phone conversation and at the same time the sound signal from the mobile phone may be transmitted to the hearing aid so that the user hears the sound via the hearing aid. This allows the hearing aid to function as a hands-free headset.

Preferably, the connecting member comprises two or more wires or at least one conductive substrate including two or more conductive paths. The connecting member may comprise 2, 3, 4, 5 or even more separate electrical conductors, e.g. separately isolated and arranged within one common cover.

The connector preferably serves to connect both the receiver and the microphone with the hearing aid via electric contacts in the connector. The contacts may be prongs extending from the connector. The contacts may be conductive areas on a substrate extending from the connector.

In a second aspect, the disclosure provides a hearing aid comprising

- a speaker assembly according to the first aspect, and
- a third housing with at least an electric energy source configured for electric connection to the speaker assembly via its connector, such as a third housing configured for being worn on or behind a user's ear.

The hearing aid preferably comprises an electronic circuit arranged in the third housing, wherein the electronic circuit comprises an amplifier circuit with an adjustable gain, so as to allow matching of a gain of the amplifier circuit with the configuration of the speaker assembly. Especially, the electronic circuit may be configured to discriminate between a plurality of possible speaker assembly types and to set the adjustable gain of the amplifier circuit accordingly. This allows the hearing aid to be automatically matched with a variety of different speaker assemblies, e.g. with different positions of the microphone along the connecting member which may have individually different amplification settings. The electronic circuit may be adjustable with one or further parameters in response to detection of which type of speaker assembly is connected via the speaker assembly connector. Further, the amplifier should be configured so as to process sound with the aim of alleviating a hearing loss of the user so as to allow the user to improve the perception of ambient sound.

Further, placing at least one of a number of microphones at one or more positions along the length of the connecting member, or wire assembly, connecting a behind-the-ear part with an in-the-ear part, provides further provide an additional degree of freedom in designing the hearing instrument, as often or most times, microphones needs to be positioned in the housing of a behind-the-ear housing located where the pinna meets the skull.

Advantageously, an input transducer may be provided as an assembly of a plurality of smaller input transducers, i.e. microphones. Advantageously, an input transducer may comprise four microphones arranged as the input transducer.

Such an input transducer may be enclosed by a case. The case may be metallic case. The microphones of the input transducer may be provided with a suspension so as to reduce ingress vibrations. The microphones may be arranged in a pattern. One advantageous pattern could be a square, or rectangle, or in-line. When having a number of microphones, these may advantageously be arranged in two or more groups, e.g. one group of two microphones arranged side-by-side and another group, at least one, microphone arranged in another configuration. Also, one group of microphones may be arranged in one pattern, and another group in another, different, pattern.

A housing for a behind-the-ear part may be shaped so that an elongated middle part extends from the housing, and this elongated middle part may then have a shape and size that is relatively small compared to the space between the pinna and the skull.

By 'hearing aid' in the present context is understood a device that is adapted to improve or augment the hearing capability of a user by receiving the transmitted output audio signal and generating a corresponding audio signal, possibly modifying the audio signal and providing the possibly modified audio signal as an audible signal to at least one of the user's ears. Such audible signals may be provided in the form of an acoustic signal radiated into the user's outer ear. The processor of the circuit mentioned above may include frequency dependent amplification.

The advantages apply equally to the second aspect as already described for the first aspect.

In a third aspect, an in-the-ear hearing aid may be provided, where a string, similar to that of the connecting member, is attached at one end to a housing of the in-the-ear hearing aid, and the other end of the string is free to be positioned either at or along the antihelix, the root of helix and/or helix. In a further possible arrangement, the sting may follow a route similar to that of a receiver-in-the-ear device, where the string rest at the top of the tragus and end behind the pinna, but without any housing or structure residing there attached to the end of the string. As the string has no attachment/housing/connector as the free end, the features described herein with respect to the input transducer itself is obviously applicable to this aspect as to the first and second aspect described above and elsewhere in the present specification.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc.

(collectively referred to as “elements”). Depending upon particular application, design constraints or other reasons, these elements may be implemented using electronic hardware, computer program, or any combination thereof.

The processor, e.g. the main processor of the hearing aid, is understood to be implemented as a known microprocessor, microcontroller, or digital signal processors (DSPs) etc. Further, the hardware of the hearing aid may comprise such as field programmable gate arrays (FPGAs), programmable logic devices (PLDs), gated logic, discrete hardware circuits, and other suitable hardware configured to perform the various functionality described throughout this disclosure.

Figure 1:
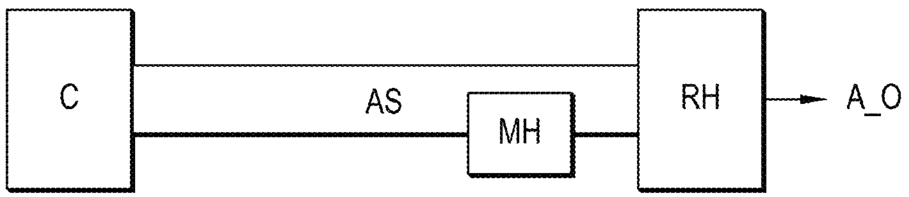
FIGS. 1-3 show a block diagram of elements of a different speaker assemblies.

FIG. 1 illustrates basic elements of a speaker assembly with a connector C and a connecting member AS comprising a plurality of electric terminals for establishing electrical connection to a hearing aid. A receiver is arranged in a receiver housing RH, and the receiver housing RH is configured for being positioned in the user’s ear canal during normal use of the speaker assembly, and for generating an audible acoustic output A_O into a user’s ear canal in response to an electric signal, i.e. a Receiver-In-The-Ear type receiver.

A microphone housing MH with a microphone for capturing sound and generating an electric output accordingly, is arranged separate from the receiver housing RH. A connecting member AS comprises a plurality of separate electrical conductors for electrical connection to the connector at one end and for electrical connection to the receiver in the receiver housing RG at the opposite end. The microphone housing MH is attached to the connecting member AS between the receiver housing RH and the connector C. In the illustration, the microphone housing MH is attached to the connecting member AS at a location closer to the receiver housing RH than the connector C, e.g. 10%-30% of a length of the connecting member AS from the receiver housing RH.

Such speaker assembly can e.g. be used with hearing aid, where a separate hearing aid housing (not shown) with at least an electric energy source (a battery) is configured for electric connection to the speaker assembly via its connector. Thus, the hearing aid housing has an electrical connector which matches the connector of the speaker assembly and which allows an electronic circuit inside the hearing aid housing to be connected to the receiver and the microphone of the speaker assembly. Especially, the hearing aid housing may house an electronic circuit comprising an amplifier with an adjustable gain, so as to allow matching of a gain of the amplifier circuit with the microphone configuration of the speaker assembly. Especially, the electronic circuit may be configured to discriminate between a plurality of possible speaker assembly types and to set the adjustable gain of the amplifier circuit accordingly, thus adopting e.g. the maximum possible gain according to the position of the microphone relative to the receiver. This allows adaptation to different types of speaker assemblies with different positions of the microphone relative to the receiver, thereby allowing a good compromise between obtainable sound quality and amplification.

Figure 2:
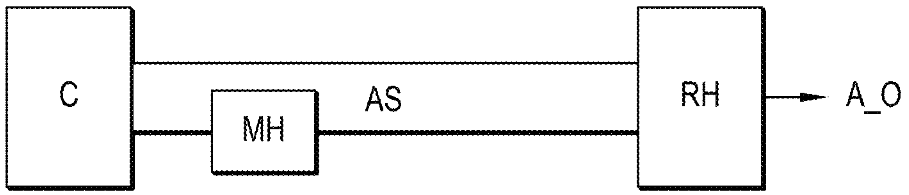

FIG. 2 shows another speaker assembly embodiment with the same elements as in FIG. 1, but with the microphone housing MH attached to the connecting member AS at a different position between the receiver housing RH and the connector C, namely closer to the connector C than to the receiver housing RH, such as 10%-30% of a length of the connecting member AS from the connector C.

Figure 3:
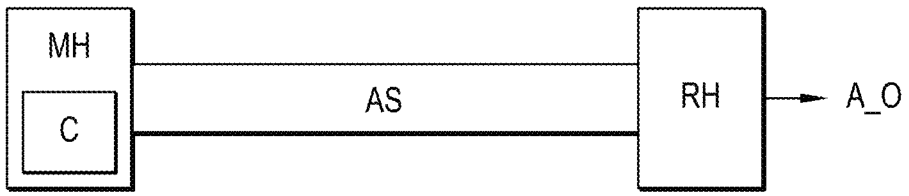

FIG. 3 shows yet another speaker assembly embodiment as in FIG. 1, but where the microphone housing MH houses the connector C, thus the microphone shares housing with the connector C. Hereby, the microphone is positioned far away from the receiver housing RH, thereby allowing a high amplification without feedback problems.

It is to be understood that the length of the connecting member AS in the illustrated can be varied according to the preferred position of the hearing aid housing. In case of a Behind-The-Ear type hearing aid housing, the connecting member length may be such as 1~4 cm, but with other hearing aid housing types, the connecting member may be significantly longer. Preferably, the connecting member AS is made flexible, so that it is allows to be at least slightly bent during normal use, so as to accommodate various anatomical dimensions of different users with one length of the connecting member AS.

Figure 4:
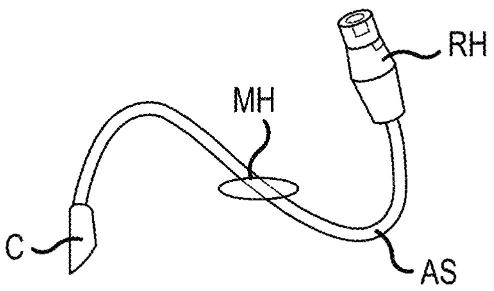
FIG. 4 shows a sketch of a speaker assembly embodiment.

FIG. 4 schematically illustrates a speaker assembly with connector C, a microphone housing MH attached to the connecting member AS at around midway between the connector C and the receiver housing RH.

It is to be understood that the microphone housing MH may be attached to the connecting member AS in various ways. E.g. the microphone housing MH e.g. being arranged under one common shield or cover or surface layer with the connecting member AS.

Figure 5:
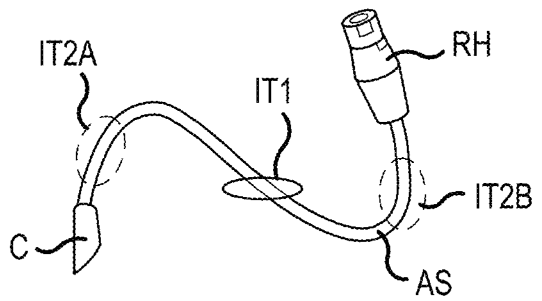
FIGS. 5 and 6 are further assembly and hearing aid with assembly.

As illustrated in FIG. 5, a connecting member includes a first part, i.e. the part near the housing of the behind-the-ear part, which has a lager thickness, or width, than the other part of the connecting member. This first part includes a microphone module. The microphone module, which could be termed an input transducer in general, comprises here four smaller, individual microphones or microphone units. Here the input transducer comprises four microphone elements arranged in a first pattern, namely in a line.

Positioning the microphone, i.e. the input transducer, away from the housing of behind-the-ear part and in the connecting member allow the microphone to be located free of contact with e.g. glasses that the user wears. This will lead to less noise from contact with the glasses, e.g. during periods where the user walk, chew or other kind of motion cases glasses to touch the behind-the-ear housing. Also, positioning the input transducer in the connecting member as opposed to in the in-the-ear part allow for better performance over time as the input transducer will be less exposed to sweat and/or cerumen.

Here the microphones of the input transducer are MEMS microphones. More than one assembly may be arranged in a connecting member, e.g. in addition to the one illustrated in FIG. 5, a second assembly may be included in the connecting member, here illustrated as dotted circles. The additional, second, microphone unit may be positioned at a position closer to the connector or closer to the in-the-ear housing relative to the first microphone unit. This results in two microphone assemblies, each assembly having one or more microphones, where the two assemblies are positioned spaced apart along the connecting member. Such two microphone assemblies may be spaced with 1 to 50 mm, such as 5 to 20 mm, such as around 10 mm, such as around 5 mm.

In a configuration where four microphones are arranged in a square, or like a rectangular, the assembly holding the four microphones have a volume of: L×D×H: 3.3×2.2×1.2=8.7 $mm^3$.

Figure 6:
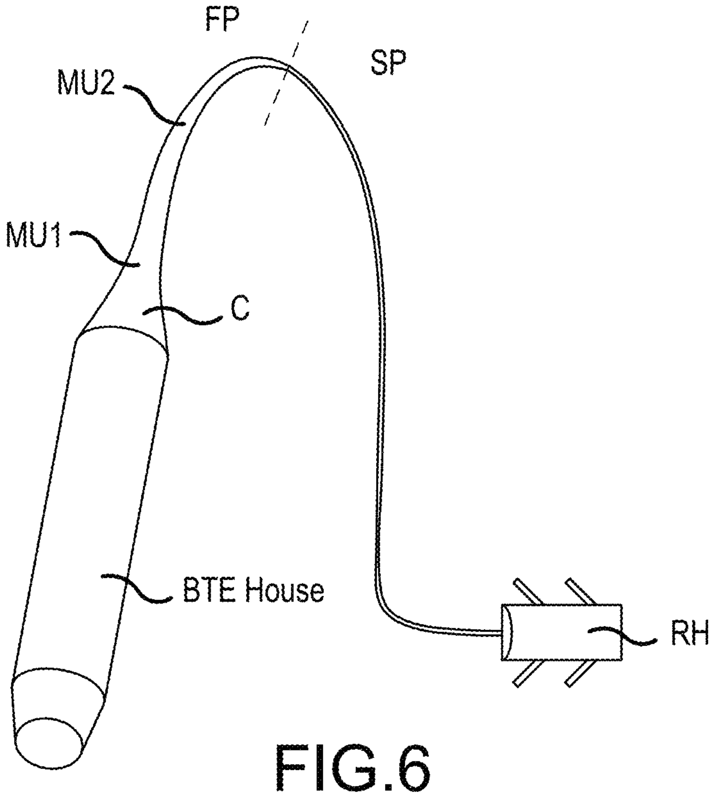

FIG. 6 schematically illustrate a hearing aid with a connecting member with a speaker in an in-the-ear housing. The connecting member comprises a first section or part having an enlarged thickness relative to the remainder of the connecting member. This provided a more rigid part with less mobility compared to the thinner, second part. In the first part, FP, two microphone units, MU1 and MU2, are located or positioned. One microphone, or input, MU1 is located closer to the connector C that the other microphone MU2. The connector C connects the connecting member to a behind-the-ear housing. The first part allow for an overall smaller, or slimmer, design of the housing of the behind-the-ear part as the housing does not need to accommodate microphones. Further, the microphones are located at a position where they do not interfere with glasses, and, the microphones are positioned at a place where they are free of the pinna so that sound from the front of the wearer may better enter the microphone. A (still) further or additional microphone may be positioned in the in-the-ear part. As indicated by the line, the connecting member is divided in a first part. FP, and a second part SP. The first part has an enlarged diameter compared to the second part SP. This makes the first part FP more rigid compared to the second part. Here two microphones, i.e. two input transducers, are positioned in the first part FP.

The receiver housing, RH, is here illustrated with a dome attached. The dome may include a soft, pliable interface for interfacing with the ear canal, and a more rigid center part for attachment to the housing surrounding the receiver. In FIG. 6, the behind-the-ear housing is illustrated as an oblong, cylindrical structure. Other shapes of the housing is possible.

Figure 7:
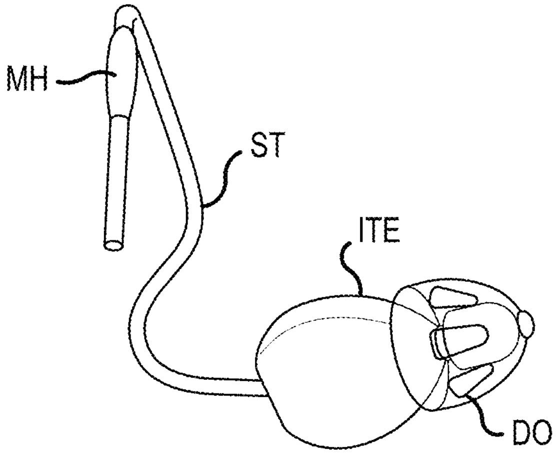
FIGS. 7 and 8 show two hearing aids, where all the electronic parts, such as processor, battery, speaker, etc. are positioned in an in-the-ear part.
Figure 8:
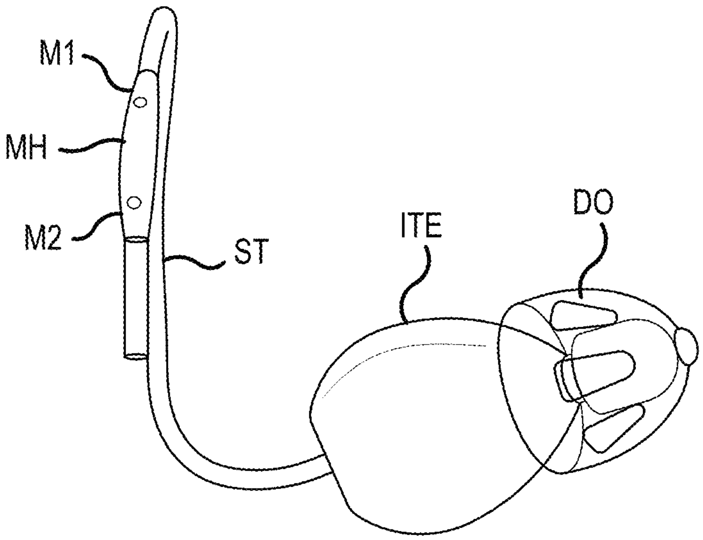

In FIGS. 7 and 8, two hearing aids are illustrated, where all the electronic parts, such as processor, battery, speaker, etc. are positioned in an in-the-ear part. Both hearing aids have a string, similar to that of the connecting member discussed above, where the string is attached at one end to the in-the-ear hearing aid housing, and the other end of the string is free to be positioned either at or along the antihelix, the root of helix and/or helix. In a further possible arrangement, the sting may follow a route similar to that of the connecting member. By positioning a microphone at the helix is contemplated to provide additionally improved sound reception. A smaller part may extend from the microphone unit as illustrated. This may help position the input transducer in e.g. the helix or to hold the string in place. The smaller part is positioned at a proximal end of the string relative to the in-the-ear housing and, here also proximal to the microphone housing.

Generally, the in-the-ear part may comprise additional units, such as further microphones, such as an ear-canal microphone, orientated towards the surrounding or towards the eardrum. Other units or components such as in-ear sensors may be included. Further, an antenna may be formed so as to allow the hearing instrument to wirelessly communicate with external devices, such as cell phone/smartphone, remote control. TV streaming device, sound streaming device, another hearing instrument, such as a contralateral hearing instrument. The antenna may advantageously be formed the connecting member/string as this will allow the antenna to be located where the performance is less affected by the pinna and/or head. Such antenna configuration is especially advantageous for high frequency antennas, such as antenna configured to operate around 2.4 GHz, or even higher frequencies. Additionally, a choke component may be included, e.g. at the microphone housing, so as to allow the antenna to have two different lengths, each for supporting an individual operational frequency, e.g. electrically seen, one part of the string/connection member is configured to support an operational frequency of 2.4 GHz, and electrically seen, another part is configured to support a second, higher, operational frequency, such as around 5 GHZ. Having one physical antenna supporting two operational frequencies is contemplated to be beneficial in that is requires less space in a hearing aid.

Further, an inductive communication unit may be included. Inductive communication has proven to provide a reliable, low-power consuming, wireless connection to a contra-lateral hearing aid or instrument.

As used, the singular forms “a,” “an,” and “the” are intended to include the plural forms as well (i.e. to have the meaning “at least one”), unless expressly stated otherwise. It will be further understood that the terms “includes,” “comprises,” “including,” and/or “comprising,” when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being “connected” or “coupled” to another element, it can be directly connected or coupled to the other element but an intervening elements may also be present, unless expressly stated otherwise. Furthermore, “connected” or “coupled” as used herein may include wirelessly connected or coupled. As used herein, the term “and/or” includes any and all combinations of one or more of the associated listed items. The steps of any disclosed method is not limited to the exact order stated herein, unless expressly stated otherwise.

It should be appreciated that reference throughout this specification to “one embodiment” or “an embodiment” or “an aspect” or features included as “may” means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

The invention claimed is:

1. An in-the-ear (ITE) hearing aid comprising:

a housing configured for insertion in the ear, wherein the housing comprises a processor configured to apply hearing adjustment to an audio signal, a battery, and a speaker configured to output audio, based on the audio signal, to a user;

a dome connected to the housing;

a string connected to the housing, wherein the string is configured to be positioned within an ear of the user, and wherein the string comprises a free end; and at least one microphone associated with the string and in communication with the processor.

2. The in-the-ear hearing aid of claim 1, wherein the string is configured to be positioned along an antihelix, a root of the helix, or a helix of the ear.

3. The in-the-ear hearing aid of claim 1, wherein the at least one microphone comprises a pair of microphones.

4. The in-the-ear hearing aid of claim 1, wherein the at least one microphone is located closer to the free end than the housing.

5. The in-the-ear hearing aid of claim 1, wherein the housing comprises a housing microphone directed towards an eardrum of the user.

6. The in-the-ear hearing aid of claim 1, wherein the housing further comprises at least part of an antenna.

7. The in-the-hear hearing aid of claim 1, wherein the string comprises a flexible tube.

8. The in-the-ear hearing aid of claim 1, wherein the at least one microphone is located within a microphone housing of the string.

9. The in-the-ear hearing aid of claim 1, wherein the free end comprises a distal tip configured to hold the string in place in the ear.

10. The in-the-ear hearing aid of claim 1, wherein the housing further comprises an inductive communication unit.

11. The in-the-ear hearing aid of claim 1, wherein the string is at least 2 cm in length.

12. The in-the-ear hearing aid of claim 1, wherein the string comprises at least one wire connecting the at least one microphone to the processor.

* * * * *